United States Patent
Mochiduki et al.

(10) Patent No.: US 7,799,424 B2
(45) Date of Patent: Sep. 21, 2010

(54) RESIN COMPOSITION, MOLDED ARTICLE AND PRODUCTION METHOD THEREOF

(75) Inventors: Katsuhiko Mochiduki, Mishima (JP); Takaaki Mihara, Mishima (JP)

(73) Assignee: Toray Industries, Inc. (JP)

( * ) Notice: Subject to any disclaimer, the term of this patent is extended or adjusted under 35 U.S.C. 154(b) by 311 days.

(21) Appl. No.: 11/887,283

(22) PCT Filed: Mar. 27, 2006

(86) PCT No.: PCT/JP2006/306146

§ 371 (c)(1),
(2), (4) Date: Sep. 27, 2007

(87) PCT Pub. No.: WO2006/104092

PCT Pub. Date: Oct. 5, 2006

(65) Prior Publication Data

US 2009/0110927 A1    Apr. 30, 2009

(30) Foreign Application Priority Data

Mar. 29, 2005 (JP) .............................. 2005-095977
Nov. 11, 2005 (JP) .............................. 2005-328145

(51) Int. Cl.
*B32B 19/00* (2006.01)
*C08G 63/00* (2006.01)

(52) U.S. Cl. ........................ 428/357; 264/168; 385/143; 385/145; 428/370; 428/401; 525/400; 528/176; 528/190; 528/192; 528/193; 528/194; 528/271; 528/272; 528/303

(58) Field of Classification Search ................ 264/168; 385/143, 145; 428/370, 401, 357; 525/400; 528/176, 190, 192, 193, 194, 271, 272, 303
See application file for complete search history.

(56) References Cited

U.S. PATENT DOCUMENTS 2,703,316 A    3/1955  Schneider

FOREIGN PATENT DOCUMENTS

| JP | 60-81225    | A | 5/1985  |
|----|-------------|---|---------|
| JP | 6-65360     | A | 3/1994  |
| JP | 96-065360   |   | 3/1994  |
| JP | 7-173266    |   | 7/1995  |
| JP | 10-204378   |   | 8/1998  |
| JP | 10-204378   | A | 8/1998  |
| JP | 2000-136435 |   | 5/2000  |
| JP | 2000-136435 | A | 5/2000  |
| JP | 2001-151871 |   | 6/2001  |
| JP | 2001-151871 | A | 6/2001  |
| JP | 2001-261797 |   | 9/2001  |
| JP | 2001-261797 | A | 9/2001  |
| JP | 2001-323056 |   | 11/2001 |
| JP | 2001-323056 | A | 11/2001 |
| JP | 2001-335626 |   | 12/2001 |
| JP | 2001-335626 | A | 12/2001 |
| JP | 2003-301327 |   | 10/2003 |
| JP | 2003-301327 | A | 10/2003 |
| JP | 2003-321602 |   | 11/2003 |
| JP | 2003-321602 | A | 11/2003 |
| JP | 2005-255806 |   | 9/2005  |
| JP | 2005-255806 | A | 9/2005  |

*Primary Examiner*—Terressa M Boykin
(74) *Attorney, Agent, or Firm*—DLA Piper LLP (US)

(57) ABSTRACT

A resin composition includes an aliphatic polyester resin. The resin has carboxyl groups at the end termini of the molecular chain and at least one compound represented by the general formula (I), the compound being added to the resin to cap a part or all of the carboxyl groups at the end termini of the molecular chain of the resin. A process for producing a fiber includes mixing a pellet comprising an aliphatic polyester resin having carboxyl groups at the end termini of the molecular chain with a compound represented by the general formula (I) so that the content of the compound becomes 0.1 to 8% by weight and then melt-spinning the resulting mixture under the conditions of a spinning temperature of 200 to 250 C.°, a melt residence time of 180 to 1800 sec and a spinning rate of 500 to 10000 m/min. (I) wherein at least one of R1 to R3 represents a glycidyl group and the other group or groups independently represents or represent a hydrogen atom, an alkyl group having 1 to 10 carbon atoms, a hydroxyl group or an allyl group.

10 Claims, 2 Drawing Sheets

RESIN COMPOSITION, MOLDED ARTICLE AND PRODUCTION METHOD THEREOF

RELATED APPLICATION

This is a §371 of International Application No. PCT/JP2006/306146, with an international filing date of Mar. 27, 2006 (WO 2006/104092 A1, published Oct. 5, 2006), which is based on Japanese Patent Application Nos. 2005-095977, filed Mar. 29, 2005, and 2005-328145, filed Nov. 11, 2005.

TECHNICAL FIELD

This disclosure relates to a resin composition and a molded article containing an aliphatic polyester of which a part or all carboxyl end groups are capped with a specific compound, and a resin composition and a molded article having a superior characteristics in hydrolysis resistance, strength and color tone to conventional aliphatic polyesters.

BACKGROUND

Recently accompanying to the increased concern to the environment in global scale, a development of a fiber material decomposable in natural environment is strongly desired. For example, since the main starting material of conventional general purpose plastics is petroleum resource, it has become a big problem that the petroleum resource would be dried up in future, or that the global warming is caused by mass consumption of the petroleum resource.

For that reason, in recent years, research and development of various plastics and fibers such as aliphatic polyesters are activated. Among them, fibers made from plastics which can be decomposed by microorganism, i.e., biodegradable plastics have drawn attention.

In addition, by making plant resources as starting materials which take in carbon dioxide from the air to grow, not only it is expected to be able to control the global warming by circulation of carbon dioxide, but also it may be possible to solve the problem of the shortage of resources. For that reason, plastics of which starting materials are plant resources, i.e., plastics made by biomass have been drawing attention.

So far, biodegradable plastics made by biomass has problems that not only their mechanical properties and heat resistance are poor, but also their production cost is high, and they have not been used as general purpose plastics. On the other hand, in recent years, as a biodegradable plastic of which mechanical properties and heat resistance are relatively high and its production cost is low, polylactic acid of which starting material is lactic acid obtainable by fermentation of starch is in the spotlight.

Polylactic acid has been used for a long time, for example, in medical field as a sewing thread for surgical operation, but recently, by an improvement of its mass production technology, it became possible to compete in cost with other general purpose plastics. Accordingly, development of its commercial product as a fiber has been activated.

As developments of polylactic acid fiber, taking advantage of its biodegradability, agricultural materials, civil engineering materials or the like are going ahead. Following those, as big scale applications, apparel applications, interior applications such as curtain or carpet, automotive interior applications and industrial material applications are also expected. However, when it is used to the apparel applications or industrial material applications, the poor hydrolysis resistance of polylactic acid becomes a big problem. For example, when the polylactic acid fiber is made into a fabric and dyed in a high temperature dye liquid at 120 to 130° C. to dye deeply, its strength decreases to a fraction of its original due to a rapid progress of hydrolysis. Furthermore, when a polylactic acid fiber product is treated for a long time under a high temperature and high humidity which are resembled to those of a tropical area, similar to the case of dyeing process, the strength decreases by hydrolysis. The same appears in injection molded articles, i.e., hydrolysis advances as time goes, and accompanied with the decrease of molecular weight, the hydrolysis is accelerated to finally result in a fatal brittleness of the articles.

As method of improving weather resistance of the polylactic acid, method of preventing hydrolysis is general, for example, it is disclosed in JP 2000-136435 A, JP 2001-261797 A, JP 2001-323056 A, JP 2001-335626 A and JP 2003-301327 A. JP 2000-136435 A discloses a method of suppressing water content of polylactic acid to thereby prevent hydrolysis at fiber production process, JP 2001-261797 A, JP 2001-323056 A, JP 2001-335626 A and JP 2003-301327 A disclose fibers of which hydrolysis resistance is improved by, respectively, adding a monocarbodiimide compound, oxazoline compound, epoxy compound, polycarbodiimide compound. However, in the method of JP 2000-136435 A, although the hydrolysis in the production process could be prevented, any of characteristics of polylactic acid itself was not changed, i.e., its durability was poor. On the other hand, the carbodiimide compound of JP 2001-261797 A and JP 2003-301327 A, isocyanate originated from the starting material generates at melt-molding and there are problems that working environment at the production process grows worse, or the color tone of the obtained molded article becomes yellowish. Furthermore, as to the compound described in JP 2001-323056 A or JP 2001-335626 A, although the inventors traced, the capping effects to carboxyl end groups was insufficient and although their durabilities were improved to those to which the compound had not been added, it was still insufficient in practical use.

SUMMARY

We provide a resin composition containing an aliphatic polyester resin of which a part or all carboxyl groups at molecular chain ends are capped with at least one kind of compounds represented by General formula (I), by adding the compound to the resin composition containing an aliphatic polyester resin having carboxyl groups at molecular chain ends:

(I)

where, at least one of $R_1$ to $R_3$ is glycidyl group and others are hydrogen, an alkyl group with 1 to 10 carbon atoms, hydroxyl group or allyl group.

We also provide a molded article in which the resin composition is molded.

We further provide a method of producing resin composition including feeding a compound represented by General Formula (I) or a composition containing the compound into a kneader such that an added amount of the compound is 0.1 to 40 wt % to a resin composition containing an aliphatic polyester resin having carboxyl groups at molecular chains ends, and extruding the composition after kneading at a kneading temperature of 200 to 250° C. within a residence time in molten state of 300 seconds or less:

(I)

wherein at least one of $R_1$ to $R_3$ is glycidyl group and others are hydrogen, an alkyl group with 1 to 10 carbon atoms, hydroxyl group or allyl group.

An aliphatic polyester composition and a molded article thereof which have excellent characteristics in hydrolysis resistance, strength and color tone can be obtained.

EXPLANATION OF REFERENCE NUMBERS

1: hopper for spinning
2: twin screw extrusion kneader
3: spinning block
4: spinning pack
5: spinneret
6: monomer suction device
7: uniflow cooling device
8: yarn
9: oiling device
10: first take-up roll
11: second take-up roll
12: winder
13: winded yarn (cheese package)
14: cheese package
15: feed roll
16: first hot roll
17: second hot roll
18: cold roll
19: ring rail
20: winded yarn (pirn)

DETAILED DESCRIPTION

The aliphatic polyester resin is a polymer of which aliphatic alkyl chains are bonded with ester bonds, which has carboxyl groups on its ends. Here, "has carboxyl groups on its ends" means that it is not necessary that all ends are carboxyl group, but those which has carboxyl groups as at least a part of the ends are included. For example, polylactic acid, polyhydroxybutyrate, polybutylene succinate, polyglycolic acid, polycaprolactone or the like are mentioned. Among them, as mentioned above, polylactic acid is most preferable.

In addition, "a resin composition containing an aliphatic polyester resin having carboxyl groups at molecular chain ends" means, for example, when polylactic acid is selected as an aliphatic polyester resin, most of it is a resin having carboxyl group at one end and having hydroxyl group at another end and, other than that, a resin having carboxyl groups at both ends and a resin having hydroxyl groups at both ends are included, and accordingly, the resin composition means a mixture of those three polymers.

In addition, "a resin composition containing an aliphatic polyester resin of which a part or all carboxyl groups at molecular chain ends are capped by a compound represented by General formula (I)" means, for example, when polylactic acid is selected as an aliphatic polyester resin, as the polymers, those of which both ends are capped with the compound of the formula (I), those of which one end is capped with the compound of General formula (I) (among them, there are two kinds of which another end is carboxyl group and hydroxyl group), and the above-mentioned three kinds of unreacted polymer are considered to be present as a mixture. Furthermore, as components other than polymers, unreacted or excessive compound of the formula (I) is present, and the resin composition is considered as a mixture of them.

These are resin compositions in case of an assumption in which polylactic acid is used as the aliphatic polyester and a compound having one glycidyl group is used as the compound of the formula (I), but in an actual case, in case where two or more kinds of polymer are used as the aliphatic polyester, a compound having two or more glycidyl groups may be used as the compound of the formula (I), and in such a case, a small amount of cross-linking reaction may occur, and therefore, it is estimated that component units of the "resin composition" may increase further.

Since it is impossible to precisely describe these constituting units, they are described as "resin composition obtained from," "resin composition containing" or "resin composition comprising," but all of them are expressions which allows co-existence of other components than the constituting units described there.

The above-mentioned polylactic acid is a polymer having —(O—CHCH$_3$—CO)— as its repeating unit, and it is a polymerization product of lactic acid or oligomer of lactic acid such as lactide. Since there are two kinds of optical isomers of lactic acid, D-lactic acid and L-lactic acid, as their polymers, there are poly(D-lactic acid) consisting only of D-type and poly(L-lactic acid) consisting only of L-type and polylactic acid consisting of both of them. Regarding the optical purity of D-lactic acid or L-lactic acid in polylactic acid, as they become lower, the crystallinity decreases and the melting point depression becomes larger. Since it is preferable that the melting point is higher than 150° C. in order to keep the heat resistance of fiber, it is preferable that the optical purity is more than 90%.

However, independent from the system in which the two kinds of optical isomers are simply mixed as stated above, after the above-mentioned two kinds of optical isomers are blended and formed into a fiber, if it is subjected to a high temperature heat treatment of 140° C. or higher to convert them into a stereo complex in which a racemic crystalline is formed, the melting point can be made as high as 220 to 230° C., and it is preferable.

The above-mentioned production method of polylactic acid is not especially limited. Concretely, the method disclosed in JP-H6-65360,A is mentioned. That is, it is a direct dehydration condensation method in which lactic acid is dehydrated and condensed as it is in a presence of an organic solvent and catalyst. In addition, a method of subjecting at least two kinds of homopolymers to a copolymerization and ester interchange reaction in a presence of a polymerization catalyst disclosed in JP-H7-173266,A is mentioned. Furthermore, there is a method disclosed in the specification of U.S. Pat. No. 2,703,316. That is, it is an indirect polymerization method in which lactic acid is once dehydrated and after making it into a cyclic dimer, it is subjected to a ring-opening polymerization.

Thus obtained polylactic acid is also a resin having carboxyl groups at its ends.

Furthermore, in the polylactic acid, a residual lactide is present as a low molecular weight residue, but this low molecular weight residue induces stain to a heater in stretching or false twisting processes, or dyeing troubles such as dyeing unevenness in dyeing process. Furthermore, water and the residual lactide react due to moisture absorption of polylactic acid to produce an organic acid, which accelerates hydrolysis of the fiber or fiber product to cause a decrease of durability. For that reason, the amount of the residual lactide in polylactic acid is preferably 0.3 wt % or less, more preferably 0.1 wt % or less, still more preferably 0.03 wt % or less. The amount of the residual lactide in polylactic acid can be determined by the method mentioned later. It is possible to decrease the amount of the residual lactide in polylactic acid, for example, by vaporizing the lactide by treating at a temperature of 80° C. or higher by using a conical dryer or the like, and by removing the lactide gas from the polymer under vacuum or by an inert gas flow.

Furthermore, if a polymerization catalyst remains in polylactic acid, it accelerates hydrolysis or production of lactide during molding process or in product, accordingly, it is preferable to inactivate said polymerization catalyst. In order to inactivate the polymerization catalyst, it is possible to inactivate by adding a chelating agent or an acidic phosphoric acid ester in the second half of the polymerization or after the polymerization, or by attaching the chelating agent or a acidic phosphoric acid ester to the surface of the obtained pellets and by kneading at the time of melt-molding. As the chelating agent used as the inactivating agent of the polymerization catalyst, although there are organic chelating agents and inorganic chelating agents, those which exhibit a particularly high effect are inorganic chelating agents. Concretely, phosphoric acids such as phosphoric acid, phosphorous acid, pyrophosphoric acid or polyphosphoric acid are preferably used, and among them, in view of the high effect with a small amount of addition, phosphoric acid is especially preferable.

Furthermore, components other than lactic acid may be copolymerized to the above-mentioned polylactic acid in a range which does not spoil its properties. As the component to be copolymerized, polyalkylene ether glycols such as polyethylene glycol, aliphatic polyesters such as polybutylene succinate or polyglycolic acid, aromatic polyesters such as polyethylene isophthalate, and ester bond formable monomers such as hydroxycarboxylic acid, lactone, dicarboxylic acid, diol are mentioned. Among them, polyalkylene ether glycol which has a good compatibility with polylactic acid is preferable.

Furthermore, as modifiers, additives such as a polymer other than aliphatic polyester, particles, a crystal nucleating agent, a flame retardant, a plasticizer, an anti-static agent, an anti-oxidant and ultraviolet absorber, or lubricant, color pigment or the like described in JP 2001-323056 A may be contained. As the above-mentioned color pigments, other than inorganic pigments such as carbon black, titanium oxide, zinc oxide, barium sulfate and iron oxide, organic pigments such as cyanine-type, styrene-type, phthalocyanine-type, anthraquinone-type, perinonetype, isoindolinone-type, quinophthalone-type, quinocridone-type and thioindigo-type can be used. Similarly, modifiers such as particles including various inorganic particles such as calcium carbonate, silica, silicone nitride, clay, talc, kaolin, zirconic acid or the like, cross-linked polymer particles and various metallic particles can also be used. Furthermore, polymers such as waxes, silicone oils, various surfactants, various fluororesins, polyphenylene sulfides, polyamides, polyacrylates including ethylene acrylate copolymer and methyl methacrylate polymer, various rubbers, ionomers, polyurethanes and their thermoplastic elastomers, can be contained in a small amount.

It is preferable that the molecular weight of the aliphatic polyester is high to improve the hydrolysis resistance, but when the molecular weight is too high, for example, fiber forming ability at melt-spinning and stretchability may become poor. It is preferable that the weight average molecular weight, Mw, is 80,000 or more in order to keep hydrolysis resistance. As the lower limit, 100,000 or more is preferable. More preferably, it is 120,000 or more. On the other hand, if the molecular weight exceeds 500,000, as mentioned above, stretchability may decrease. For that reason, as a result, molecular orientation decreases and fiber strength decreases. Accordingly, Mw is preferably 500,000 or less and 350,000 or less is more preferable. More preferably, it is 250,000 or less.

Furthermore, as to the weight average molecular weight and the number average molecular weight of the aliphatic polyester constituting the composition, although they vary a little because the compound expressed by the above-mentioned formula (I) reacts with the carboxyl group at the end of the aliphatic polyester when it is melted and kneaded, it is preferable that the ratio (Mw/Mn) of the weight average molecular weight, Mw, and the number average molecular weight, Mn, of the aliphatic polyester constituting the composition is 1.5 to 4, more preferably, 1.5 to 3 and still more preferably, 1.5 to 2. This molecular weight ratio, Mw/Mn, is an index indicating the degree of variance of the molecular weight distribution, and it indicates that the smaller this value is, the narrower the molecular weight distribution. In melt-spinning, the smaller the Mw/Mn of polymer, the smaller the variance of physical properties of extruded fiber, and that is preferable since processability is stable in spinning, taking-up, stretching, false twisting and fabricating processes. Similarly, in injection molding, too, faultless and high-quality molded article can be obtained. Where, Mw, Mn are values measured by gel-permeation chromatography and converted to those of polystyrene.

In case where the molded article is a fiber, in order to produce a fiber, especially which is called "ultrafine", in good quality by melt-spinning, this index becomes an important parameter. In case where a single fiber thickness of 10 dtex or more, Mw/Mn may be 4 or less, but if the single fiber thickness is 3 to 10 dtex, it is 3 or less, if the single fiber thickness is 1 to 3 dtex, it is 2.5 or less, if single fiber thickness is 0.3 to 1 dtex, it is 2 or less, and further, in case of an ultrafine fiber of single fiber thickness of 0.3 dtex or less, by adjusting it 1.8 or less, a stable fiber forming ability in melt-spinning can be maintained.

It is helpful to improve hydrolysis resistance by capping carboxyl end groups. In addition, it is helpful to have an improvement of modulus or big improvement of color tone (high degree of whiteness) of product, and a prevention of decrease of physical properties after a long use, without spoiling mechanical properties, especially, without spoiling tensile strength after the end-capping. As compounds which satisfy all of these characteristics, we found 1 to 3 functional glycidyl-modified compound having a triazine skeleton expressed by the above-mentioned General formula (I). In the compound expressed by General formula (I), it is necessary that at least one of $R_1$ to $R_3$ is glycidyl group. By the presence of 1 to 3 above-mentioned glycidyl groups in the triazine skeleton, it is possible to highly efficiently react with the carboxyl end groups even in case of an aliphatic polyester of which molding temperature is relatively low. Furthermore, since its viscosity does not increase like carbodiimide compounds, its molecular chain orientation is not impaired at melt-spinning or stretching process, and it exhibits an excellent mechanical properties even after the end-capping. In addition, the compound has a high heat resistance, and there is no problem of coloration even molded at a high temperature. Furthermore, since it is excellent in color fastness to light, it can preferably be used also in applications exposed to sun-light which includes clothings such as an outer or sports wear, automotive interior materials, canvas materials and lopes. And, since its viscosity does not increase also in production process, and high speed fiber forming ability is not impaired, an ultra-high-speed spinning exceeding spinning speed of 10000 m/min is possible. The high elongation characteristics of the high speed spinning fiber obtained at a spinning speed of 6000 to 10000 m/min is more excellent than the fiber taken up at the same spinning speed but which does not contain the additive. Such characteristics could not be found in conventional end-capping agent.

The glycidyl groups bonded to $R_1$ to $R_3$ are preferably 2 groups, and more preferably, one group. Of course, a plurality of compounds of which number of addition of glycidyl group is different may be mixed (usually, a mixture of which number of glycidyl groups is 1 to 3 is formed in a specified component distribution in synthesizing step of the compound of General formula (I)). And, among $R_1$ to $R_3$, other groups than the glycidyl group are groups selected from hydrogen, an alkyl group with 1 to 10 carbon atoms, hydroxyl group and an allyl group. It is preferable that the number of carbon atoms in the alkyl group is small, and it is preferable that the number of carbon atoms is 1 to 5. Among the above-mentioned, in view of excellence of, especially, end-capping ability and mechanical properties of fiber, as the compound expressed by General formula (I), diallyl monoglycidyl isocyanurate (hereunder, described as DAMGIC), monoallyl diglycidyl isocyanurate (hereunder, described as MADGIC) and triglycidyl isocyanurate (hereunder, described as TGIC) are preferably used.

The above-mentioned TGIC is a three functional substance which has 3 glycidyl groups in the compound, but in the molding temperature mentioned later, i.e., in the range of 200 to 250° C., it does not cross-link and does not produce a gel. Accordingly, the degree of variance, Mw/Mn, of the compound does little change before and after the addition (if a cross-linked structure is taken, since increase of Mw is larger than increase of Mn, Mw/Mn value becomes large). As a result, dispersion of physical properties of extruded fiber is small, and an ultra-high-speed spinning of which spinning speed exceeds 10000 m/min is also possible. And, it shows a stable processability in not only spinning and take-up processes, but also in stretching, false twisting and fabric production process.

Regarding the compound expressed by General formula (I), for example, in case of TGIC, it is possible to be produced by reacting isocyanuric acid and epichlorohydrin under a catalyst, but commercialized product may be used. As the amount of residual epichlorohydrin in TGIC becomes smaller, a volatilization at melt-molding becomes smaller and it is preferable. The concentration of epichlorohydrin in TGIC is preferably, 0 to 1000 ppm, more preferably, 0 to 500 ppm and still more preferably, 0 to 200 ppm.

Furthermore, in the composition, since a part or all carboxyl groups of the aliphatic polyester resin ends are capped by the compound of the above-mentioned general formula (I), carboxyl end group concentration is low. The carboxyl end group concentration means not only the carboxyl end groups of the polymer, but the total amount of carboxyl end groups including also those of the residual oligomer and those originated from monomer. To impart a sufficient hydrolysis resistance, it is preferable that the carboxyl end group concentration is 25 equivalent/ton or less, more preferably, 15 equivalent/ton or less, still more preferably, 10 equivalent/ton or less, especially preferably, 0 to 7 equivalent/ton. And, to keep the hydrolysis resistance for a long time, it is preferable that unreacted compound expressed by General formula (I) is left in the composition. By designing the compound in such a way, carboxyl end groups newly produced by hydrolysis are also capped. The carboxyl end group concentration can be controlled by the amount of addition of the above-mentioned compound expressed by General formula (I). It is preferable that the amount of addition of the compound of General formula (I) is, as epoxy equivalent, 1.05 equivalents or more to the amount of the total carboxyl end groups of the aliphatic polyester. Accordingly, the amount of addition of said compound depends on the amount of total carboxyl end groups of the starting material, the aliphatic polyester, but the amount of addition of the compound expressed by General formula (I) is usually 0.1 to 8 wt % to the total amount with the aliphatic polyester resin. Here, in $R_1$ to $R_3$ of the compound expressed by General formula (I), when the number of addition of glycidyl group is 2 or 3, the Mw/Mn of the polymer may increase due to connection of chains or cross-linking of the aliphatic polyester. And, if the unreacted substance is too excessive, it is drained out of the fiber system in the melt-spinning or fabric production process, and it is not used for the initial purpose. Accordingly, it is preferable that the amount of addition of the compound expressed by General formula (I) is 0.2 to 5 wt % to the total amount with the aliphatic polyester resin, and 0.3 to 3 wt % is more preferable. Still more preferably, it is 0.4 to 2 wt %. Furthermore, it is preferable that the compound is added excessively to the carboxyl end group concentration contained in the aliphatic polyester. This is because, the unreacted compound left in the composition caps the carboxyl end groups produced by hydrolysis and has an effect of suppressing the increase of carboxyl end groups.

Furthermore, other than the above-mentioned compound expressed by General formula (I), compounds having oxazoline group, carbodiimide group, aziridine group, imide group or isocyanate group which is reactive with carboxyl end groups may be added together. As concrete examples of such compound, diisopropyl phenyl carbodiimide, phenylene bisoxazoline or the like are mentioned.

Furthermore, to react the compound expressed by General formula (I) with the carboxyl end groups efficiently, metal salt of carboxylic acid, especially as the metal, alkali metal compound, alkaline earth metal compound, in addition, tertiary amine compound, imidazole compound, quaternary ammonium salt, phosphine compound, phosphonium salts, phosphoric acid ester, organic acids, Lewis acids are mentioned, and as their concrete examples, alkali metal compounds such as sodium hydroxide, potassium hydroxide, lithium hydroxide, cesium hydroxide, sodium hydrogen carbonate, potassium hydrogen carbonate, sodium carbonate, potassium carbonate, lithium carbonate, sodium acetate, potassium acetate, lithium acetate, sodium stearate, potassium stearate, lithium stearate, sodium boron hydride, lithium boron hydride, sodium phenyl boron, sodium benzoate, potassium benzoate, lithium benzoate, disodium hydrogen phosphate, dipotassium hydrogen phosphate, dilithium hydrogen phosphate, bisphenol A disodium salt, bisphenol A dipotassium salt, bisphenol A dilithium salt, phenol sodium salt, phenol potassium salt, phenol lithium salt and phenol cesium salt, alkaline earth metal compounds such as calcium hydroxide, barium hydroxide, magnesium hydroxide, strontium hydroxide, calcium hydrogen carbonate, barium carbonate, magnesium carbonate, strontium carbonate, calcium acetate, barium acetate, magnesium acetate, strontium acetate, calcium stearate, magnesium stearate and strontium stearate, tertiary amines such as triethyl amine, tributyl amine, trihexyl amine, triamyl amine, triethanol amine, dimethyl amino ethanol, triethylene diamine, dimethyl phenyl amine, dimethyl benzyl amine, 2-(dimethyl aminomethyl)phenol, dimethyl aniline, pyridine, picoline, 1,8-diazabicyclo(5,4,0)undecene-7, imidazole compounds such as 2-methyl imidazole, 2-ethyl imidazole, 2-isopropyl imidazole, 2-ethyl-4-methyl imidazole, 4-phenyl-2-methyl imidazole, quaternary ammonium salts such as tetramethyl ammonium chloride, tetraethyl ammonium chloride, tetrabutyl ammonium bromide, trimethyl benzyl ammonium chloride, triethyl benzyl ammonium chloride, tripropyl benzyl ammonium chloride, N-methylpyridinium chloride, phosphine compounds such as trimethyl phosphine, triethyl phosphine, tributyl phosphine, trioctyl phosphine, phosphonium salts such as tetramethyl phosphonium bromide, tetrabutyl phosphonium bromide, tetraphenyl phosphonium bromide, ethyl triphenyl phosphonium bromide, triphenyl benzyl phosphonium bromide, phosphoric acid esters such as trimethyl phosphate, triethyl phosphate, tributyl phosphate, trioctyl phosphate, tributoxyethyl phosphate, triphenyl phosphate, tricresyl phosphate, trixylenyl phosphate, cresyl diphenyl phosphate, octyl diphenyl phosphate, tri(p-hydroxy)phenyl phosphate, tri(p-methoxy)phenyl phosphate, organic acids such as oxalic acid, p-toluene sulfonic acid, dinonyl naphthalene disulfonic acid, dodecyl benzene sulfonic acid, Lewis acids such as boron trifluoride, aluminium tetrachloride, titanium tetrachloride, tin tetrachloride, etc., are mentioned, and these can be used alone or two or more in combination. Among them, it is preferable to use alkali metal compound, alkaline earth metal compound, phosphine compound, phosphoric acid ester, and especially, organic salts of alkali metal or alkaline earth metal can be preferably used. Particularly preferable compounds are sodium stearate, potassium stearate, calcium stearate, magnesium stearate, sodium benzoate, sodium acetate, potassium acetate, calcium acetate and magnesium acetate. Furthermore, organic salts of alkali metal or alkaline earth metal of which number of carbons is 6 or more are preferable, i.e., when a catalyst such as sodium stearate, potassium stearate, calcium stearate, magnesium stearate or sodium benzoate is added, it is preferable since the reaction efficiency can be improved. And, use of a catalyst based on a lactic acid such as sodium lactate, calcium lactate or magnesium lactate is also preferable since their compatibility with polylactic acid is good. Other than that, for the purpose of preventing decrease of heat resistance of the resin due to the addition of catalyst, it is possible to use, singly or in combination, catalysts of which molecular weight is relatively high such as a metal salt of stearic acid. It is preferable that the amount of addition of said catalyst is 5 to 2000 ppm to fiber in view of controlling its dispersibility and reactivity. It is, more preferably, 10 to 1000 ppm, still more preferably, 20 to 500 ppm.

In the molded article, by using the compound expressed by General formula (I) as end-capping agent, it is possible to obtain a molded article of a high degree of whiteness without depending its molding conditions. And, since it becomes unnecessary to precisely control molding temperature or residence time in molten stage, not only easiness and stability of production are improved remarkably, but also a molded article excellent in color tone and in mechanical characteristics can be obtained. Therefore, degree of whiteness of molded article can achieve, in most cases, a* −5 to 5 which is the index of reddish tone in L*a*b* color system. By this fact, together with the b* value mentioned later, it becomes possible to also use in applications which require a high degree of whiteness. It is possible to achieve, in an preferable embodiment, −3 to 3 as the a* value, in a more preferable embodiment, −2 to 2. And, regarding the b* value which is the index of yellowish tone, in most cases, it is possible to achieve −6 to 6, and in a preferable embodiment, it is possible to achieve −5 to 5, in a more preferable embodiment, −4 to 4 and in most preferable embodiment, −3 to 3. And, regarding the L* value which is the index of whiteness, although it depends on product application, it is preferably to be 50 to 80 in an application which requires transparency or clearness, and 80 to 98 in an application which requires a mat tone. In case where a conventional end-capping agent is used, color tone is apt to be cloudy and only mat tone product of which L* value is high could be obtained, but since the end-capping agent used does not change original color tone of polymer, and accordingly L* can be controlled easily. It is possible to control L* value by selecting a particle of which refractive index is higher than the polymer and by the amount of its addition, and for example, by adding titanium oxide, calcium carbonate, silica, talc, kaolinite or the like to the aliphatic polyester in an amount of 0.001 to 10 wt %, it is possible to produce a product of which transparency is high and a product of ultra-mat tone. To increase transparency or clearness as high as possible, the above-mentioned particle should not be added or added in a very little amount of 0.1 wt % or less.

The production method of the composition is not especially limited but, for example, the following methods can be adopted. That is, it is possible to produce by adding the above-mentioned compound expressed by General formula (I) to the above-mentioned aliphatic polyester, and by mixing in a molten or solution state to react with each other, for example, a method of adding the above-mentioned compound expressed by General formula (I) to the aliphatic polyester in a molten state just after condensation polymerization reaction and by stirring, a method of adding the above-mentioned compound expressed by General formula (I) to the aliphatic polyester chip and after mixing, they are reacted by melt-kneading in a reaction container, extruder or the like, a method of liquefying the above-mentioned compound expressed by General formula (I) and continuously adding it to the aliphatic polyester in an extruder, and reacting them by melt-kneading, a method of melt-kneading and reacting, in an extruder or the like, a blend chip of a master chip of the aliphatic polyester in which the above-mentioned compound expressed by General formula (I) is contained in a high concentration and a homo-chip of the aliphatic polyester, etc. In case of preparing the master chip, it is preferable that the amount of addition of the above-mentioned a compound represented by General formula (I) is 1 to 40 wt % to the total amount with the aliphatic polyester resin, and 3 to 20 wt % is more preferable. In case where they are melt-kneaded by an extruder, said two components (aliphatic polyester and the compound) are mixed beforehand such that the amount of addition of the compound would be 0.1 to 40 wt %, or the aliphatic polyester and the compound are continuously fed to the extruder while measuring them independently. In case where they are mixed beforehand, since they are apt to be phase-separated due to difference of their particle sizes and may cause a distribution of the compound concentration, it is necessary to arrange the particle sizes. At this time, it is necessary to control the particle size difference to at most 2 times or less (average weight of particles of large particle size component/average weight of particles of smaller particle size component is 2 or less). Preferably, the difference of particle sizes is 1.5 times or less, still more preferably, 1.2 times or less. It is more preferable to feed the above-mentioned two components while measuring separately, since it is unnecessary to arrange the particle sizes and the operation is simple.

It is preferable to use a twin screw extruder which has a higher kneading ability since it is necessary to diffuse the compound in the aliphatic polyester by the kneading. And, it is preferable that the kneading temperature is 200° C. or more to make sufficient reaction of the aliphatic polyester with the compound. On the other hand, it is preferable that the kneading temperature is 250° C. or less to prevent a pyrolysis of the aliphatic polyester. It is preferable that the output is controlled so that the residence time in molten state at the kneading is at least 30 seconds or more, since it is necessary to sufficiently diffuse the compound in the aliphatic polyester. On the other hand, if the residence time in molten state becomes long, pyrolysis of the aliphatic polyester is accelerated, and therefore, it is preferable to control the residence time in molten state to 300 seconds or less. More preferable residence time in molten state is 60 to 270 seconds, more preferably, 90 to 240 seconds. Where, the residence time in molten state was measured by taking the time at which the colored pellet is fed to an extruder as T0, and after the extruded gut is started to be colored, the time at which the color reaches the deepest in visual observation was taken as T1, and T1–T0 was taken as the residence time. Furthermore, the measurement of the residence time was carried out 10 times and its average value was taken.

In addition, to accelerate diffusion and reaction of the compound at kneading, it is preferably adopted to increase shear rate by increasing screw rotation speed, or to use a screw of which kneading ability is enhanced. And, to produce the molded article comprising the composition, a method of melt-molding the composition obtained by the above-mentioned method into a fiber film, sheet or various molded article from a molten or solution state, a method of adding the above-mentioned compound expressed by General formula (I) to the above-mentioned aliphatic polyester in the above-mentioned master chip configuration or in configuration without change, and melt-molding directly into a fiber film, sheet or various molded article from a molten or solution state, etc., can be adopted. When a fiber is produced by melt-spinning said composition, it is preferable to control the spinning temperature to 200 to 250° and the residence time in molten state to 180 to 1800 seconds. The residence time in molten state can be determined by the same way as that of the kneading, i.e., by taking the time at which the colored pellet is fed to an extruder as T0, and the time at which the color of the extruded fiber reaches the deepest was taken as T1, and from the difference of the times (T1–T0), it can be determined.

Furthermore, by making the spinning speed to 500 to 10000 m/min, a molecular orientation is generated, and it is preferable since it can improve processability in the following stretching process. The spinning speed is the peripheral speed of the first godet roll for taking up the yarn. And, to carry out drawing and false twisting or the like simultaneously, since it is necessary to increase the molecular orientation further, spinning speed is preferably 2000 m/min or more, and 3000 m/min or more is more preferable. Most preferably, it is 4000 m/min or more. On the other hand, when process stability at spinning is considered, it is preferable that the spinning speed is 7000 m/min or less.

The molded article is provided with both of heat resistance and hydrolysis resistance excellent in practical durability. Accordingly, it is applicable in wide field. At the application, the molded article may be used alone, but for example, it can also be used in combination with other molded article such that by making into a moisture absorbable sheet by laminating a porous olefin film to a non-woven sheet.

The molded article is particularly effective for, among the above-mentioned configurations, applications which require a hydrolysis resistance due to its high surface area per volume, for example, in the field of fiber, film and sheet. In the case where the molded article is, for example, a fiber, it becomes possible to dye with an water dispersed solution of a dye at a high temperature and to dye deeply or clearly without spoiling the fabric strength. And, when it is used for fishery materials such as fishing net, by properly capping the carboxyl end groups, it is possible to obtain a fiber in which practically necessary and sufficient strength can be maintained during its using period. Furthermore, due to its excellent long term stability, it does not deteriorate during a long term storage for several years, or during a storage under a high temperature and high humidity environment, and can exhibit its initial performance.

In cases where the molded article is a fiber, it can be used in configurations such as multifilament, monofilament, staple fiber, tow or spunbond. Among these, it is especially preferably used as multifilament since fiber forming ability at high speed spinning, color tone and mechanical characteristics such as strength are excellent.

Furthermore, it is preferable to impart bulkiness and softness by subjecting to false twisting or bulky crimping processes. Furthermore, as structural configuration, it can be applied to woven fabric, knitted fabric, non-woven fabric, pile, padding or the like, and as a fiber to be used in combination, natural fiber, regenerated fiber, semi-synthetic fiber, synthetic fiber or the like are mentioned, and they may be subjected to paralleling, twisting or filament mixing. As other fiber to be used in combination, natural fibers such as cotton, flax, wool and silk, or regenerated fibers such as rayon and cupra, semi-synthetic fibers such as acetate, synthetic fibers such as nylon, polyester (polyethylene terephthalate, polybutylene terephthalate or the like), polyacrylonitrile and polyvinyl chloride, etc., can be used.

In addition, as applications of structure in which fiber is used, there are apparel in which hydrolysis resistance is required, for example, sports wears such as outdoor wear, golf wear, athletic wear, ski wear, snow board wear and pants thereof, casual wears such as blouson, outers for ladies and gentlemen such as coat, winter clothes and rain wear. And, as application which requires excellent durability for a long term use or excellent durability characteristics against moisture degradation, there are applications for uniform, futons such as kakefuton (a comforter) or shikibutone (futon mattress), hadakakefuton (thin futon), totatsu (wooden table frame covered by a futon, with a heat source underneath) futon, zabuton (cushion for sitting), baby futon and blanket, fabric exteriors or coverings such as of pillow and cushion, mattress or bed pad, sheets such as for hospital, medical care, hotel and baby, and further, bedding materials such as covering of sleeping-bag, cradle, baby car, etc, and can also be preferably used in these applications. Furthermore, it can preferably be used for interior materials of automobile, and among them, automobile carpet or non-woven fabric for ceiling which require a high hydrolysis resistance and moisture degradation resistance are the best applications. Furthermore, it is not limited to these applications and, for example, antigrass sheet for agriculture or waterproof sheet for construction materials, fishing thread, fishing net, layer cultivation net, non-woven for vegetation protection, net for public works, sandbag, pot for raising seedings, agricultural materials, draining bag, etc., are mentioned.

In cases where the molded article is a film or sheet, a wrapping film, films for agriculture and horticulture, shopping bag, garbage bag, compost bag or the like, as other molded articles, containers or tablewares such as bottles for drink or cosmetics, disposable cup, tray, knife, fork or spoon, flowerpot, seeding raising bed or the like are mentioned.

In cases where the molded article is used as a multifilament, in view of practical use, its strength is 2.0 cN/dtex or more, more preferably, 2.5 cN/dtex or more, still more preferably, 3.0 cN/dtex. On the other hand, the upper limit of the strength is, in view of possibility of industrial stable production, 9.0 cN/dtex or less. And, although the elongation of fiber is suitable selected according to the fiber application, for general purpose, it is in the rage of 10 to 300%, in an application in which a high strength and dimensional stability are required, it is 10 to 100%, more preferably, 20 to 80%. In an application in which flexibility is required, it is preferable to be 100 to 300%. And, since the compound does not spoil the crystallinity of the aliphatic polyester, it is possible to easily control boiling water shrinkage, which is an index of dimensional stability. For that reason, if the boiling water shrinkage is 0 to 20%, it is preferable since the dimensional stabilities of multifilament fiber and product thereof are good. More preferable boiling water shrinkage is 1 to 15%, still more preferably, 2 to 10%.

In addition, it is preferable that yarn unevenness, U %, which is an index of quality in yarn longitudinal direction is 0.1 to 2%. When a compound which easily crosslinks is used, viscosity unevenness is generated easily in a spinning pack, and an unevenness of fiber thickness generates between spinning holes or in longitudinal direction, but since the compound is unlikely to be crosslinked, there is almost no unevenness of viscosity and a multifilament without the yarn unevenness can be obtained. The yarn unevenness, U %, is preferably, 0.1 to 1.5% and more preferably 0.1 to 1%.

In addition, it is preferable that the strength retention which is an index of hydrolysis resistance is 50 to 99%. In case where a general purpose polylactic acid is simply made into a fiber, as indicated in Comparative example 1 in the examples, it exhibits very low hydrolysis resistance as 32%. On the other hand, the hydrolysis resistance of the multifilament can be controlled to 50 to 99%, which is a range of no problem in practical use. The strength retention is more preferably, 70 to 99%, still more preferably, 80 to 99%, and especially preferably, 85 to 99%. Method of measurement of the strength retention is described in detail in the examples, but it is a value determined from the ratio of strengths before and after the treatment when treated in high temperature water at 130° C. for 40 minutes.

The strength, elongation and boiling water shrinkage of the above-mentioned multifilament can be controlled by spinning temperature, spinning speed, stretching temperature, stretch ratio, etc., and in case of polylactic acid fiber, its strength can be increased by subjecting to an orientation crystallization beforehand by high speed spinning, and then by stretching at a high temperature and in a high stretch ratio. And, by suitably controlling the stretch ratio, it is possible to change elongation.

Furthermore, single fiber thickness of fiber may be properly decided according to its use, and it is usually 0.1 to 10000 dtex. And, it is preferable that the total thickness as multifilament is made into 5 to 10000 dtex. Furthermore, regarding the cross-sectional shape, circular, hollow, flat, multilobals such as trilobal, W-cross section, X-cross section or other non-circular cross sections can freely be selected.

In cases where the molded article is a film, there is especially no limitation in film thickness, and it may be determined according to characteristics required in its application, for example, it may be determined by mechanical strength, biodegradation rate, price or the like, but it is usually 5 to 1000 μm, and the range of 10 to 200 μm is especially preferably selected. And, in view of practical use, it is preferable that the average values of tensile moduli (Young's moduli) of longitudinal direction and transverse direction are, respectively, 1 GPa or more, furthermore, 2 GPa or more, and it is preferable that the average values of tensile strengths in longitudinal direction and transverse direction are, respectively, 50 MPa or more, furthermore, 100 MPa or more. On the other hand, regarding the upper limits of tensile modulus and tensile strength, in view of stable industrial production, it is preferable that the average value of tensile moduli is 10 GPa or less, and the average value of tensile strengths is 1 GPa or less. The tensile modulus or tensile strength of the above-mentioned film can be controlled by, film-forming temperature, stretching temperature, stretch ratio or the like, and it is possible to increase the tensile strength and tensile modulus by increasing stretch ratio by a multi-stage stretching.

Furthermore, the film may be subjected to various surface treatments for the purpose of improving printability, laminatability, coatability, etc. As the method of surface treatment, corona discharge treatment, plasma treatment, flame treatment, acid treatment, etc., are mentioned and all of them can preferably be used, but corona discharge treatment is most preferable since a continuous treatment is possible and an installment to preexisting film-forming plant is easy and the treatment is simple.

EXAMPLES

Hereunder, our resins, molded articles and methods are explained in detail with reference to examples. Where, as the measuring methods in examples, the following methods were applied:

A. Weight Average Molecular Weight of Aliphatic Polyester

Tetrahydrofuran was mixed to a sample solution in chloroform as a solution to be measured. This was subjected to gel-permeation chromatography (GPC) measurement and weight average molecular weight, Mw, number average molecular weight, Mn, and further, the ratio of Mw/Mn converted as those of polystyrene were determined.

B. Residual Amount of Lactide

A sample 1 g was dissolved in dichloromethane 20 ml and acetone 5 ml was added to this solution. Furthermore, it was precipitated with cyclohexane, to analyze by liquid chromatography with GC17A of Shimazu Corp., and the amount of lactide was determined by an absolute calibration curve.

C. Carboxyl End Group Concentration

A sample weighed precisely was dissolved in o-cresol (water content 5%), and after a suitable amount of dichloroethane was added to this solution, the carboxyl end group concentration was determined by titration with 0.02N KOH solution in methanol. At this time, since oligomers such as lactide, which is a cyclic dimer of lactic acid, was hydrolyzed to produce carboxyl end groups, a carboxyl end group concentration in which all of carboxyl ends of polymer, carboxyl ends originated from monomer and the carboxyl ends originated from the oligomer are totaled is obtained.

D. Melting Point of Polymer

A temperature which gives a peak value by fusion in endothermic curve obtained by using a differential scanning calorimeter, DSC-7, of PerkinElmer Japan Co., Ltd. with a 20 mg sample and at a heating rate of 16° C./min was taken as the melting point (° C.).

E. Fiber Strength and Elongation

Samples were subjected to measurement by Tensilon UCT-100 of Orientec Co., Ltd. under the constant rate extension condition indicated in JIS L1013 (Chemical-fiber-filament-yarn test method, 1998) (grip-to-grip distance: 20 cm, extension rate: 20 cm/min). Where, the elongation at break was determined from the elongation at the point of maximum strength in S-S curve.

F. Film Strength

Samples were subjected to measurement by Tensilon UCT-100 of Orientec Co., Ltd. under the constant rate extension condition indicated in JIS K7127 (1998) (extension rate: 100 mm/min). Where, the elongation at break was determined from the elongation at the point of maximum strength in S-S curve.

G. Boiling Water Shrinkage

Samples were immersed in boiling water for 15 minutes and the boiling water shrinkage was determined from the dimensional change between before and after the immersion according to the following equation:

Boiling water shrinkage(%)=(($L0-L1$)/$L0$)×100

L0: Length of the hank under initial load of 0.088 cN/dtex when samples were taken as a hank.

L1: Length of the hank under initial load of 0.088 cN/dtex after the hank subjected to the L0 measurement were treated with boiling water under load free and air dried for one day and night.

H. Strength Retention

As an accelerated test of hydrolysis resistance, sample 1 g was fixed so that it would not shrink (in case of a fiber, it was winded on a bobbin, and in case of a film, it was fixed to a frame), and after it was put into an airtightly sealable container together with 300 ml water, and after heating at heating rate of 4° C./min to water temperature in the container of 130° C., it was kept at that temperature for 40 minutes, and subsequently, it was cooled at a cooling rate of 4° C./min, the sample was taken out when the water temperature becomes lower than 50°, washed with water, and the strength retention was calculated by the ratio of the strengths (see the equations below) of before and after the above-mentioned heat treatment:

Strength retention(%)=$T1/T0$×100

T0: Tensile strength before heat treatment
T2: Tensile strength after heat treatment.

I. Color Tone

In case of a fiber, sample are closely winded on a transparent plate such that the plate color can substantially be ignored, and L*a*b* is measured by Minolta Spectrophotometer CM-3700d. At this time, as the light source, D65 (Color temperature: 6504K) is used, and the measurement is carried out at 10° field of vision. Furthermore, in case of a film, it is measured by piling up the film to a thickness of 500 μm.

Production Example 1

Production of Polylactic Acid (PLLA)

Lactide made from L-lactic acid of optical purity 99.5% was polymerized in presence of bis(2-ethyl hexanoate)tin catalyst (molar ratio of lactide:catalyst=10000:1) under nitrogen atmosphere at 180° C. for 230 minutes to obtain polylactic acid P1. The weight average molecular weight of the obtained polylactic acid was 221,000. Furthermore, the amount of residual lactide was 0.13 wt %, the total carboxyl end group concentration was 30 equivalent/ton and the melting point was 173° C.

Example 1

Production of Polylactic Acid Containing 10 wt % DAMGIC

P1 and diallyl monoglycidyl isocyanurate (hereunder, referred to as DAMGIC) produced by Shikoku Chemicals Corp. were dried and then fed to a twin screw kneading extruder (screw diameter: 37 mm, L/D: 38.9) produced by Toshiba Machine Co., Ltd. such that the ratio would be P1:DAMGIC=90:10 (weight ratio), and kneaded at cylinder temperature 200° C., screw rotation speed 300 rpm and an output 250 g/min (residence time 120 sec) to obtain polylactic acid P2 which contains 10 wt % DAMGIC. The amount of residual lactide of the obtained polylactic acid was 0.15 wt %. Where, as to the residence time, the time when colored chips were fed to the kneader was recorded as T0 and the extruded gut was started to be colored and the time when the color became deepest in visual observation was taken as T1, and T1–T0 taken as the residence time. Furthermore, the measurement of the residence time was repeated 10 times and their average value was taken.

Example 2

Production of Polylactic Acid which Contains 10 Wt % MADGIC

P1 and monoallyl diglycidyl isocyanurate (hereunder, referred to as MADGIC) produced by Shikoku Chemicals Corp. were dried and then fed to a twin screw kneading extruder (screw diameter: 37 mm, L/D: 38.9) produced by Toshiba Machine Co., Ltd. such that the ratio would be P1:MADGIC=90:10 (weight ratio), and kneaded at cylinder temperature 200° C., screw rotation speed 300 rpm and an output 250 g/min (residence time 120 sec) to obtain polylactic acid P3 which contains 10 wt % MADGIC. The amount of residual lactide of the obtained polylactic acid was 0.15 wt %.

Example 3

Production of Polylactic Acid which Contains 10 Wt % TGIC

P1 and triglycidyl isocyanurate (hereunder, referred to as TGIC) produced by Nissan Chemical Industries, Ltd. were dried and then fed to a twin screw kneading extruder (screw diameter: 37 mm, L/D: 38.9) produced by Toshiba Machine Co., Ltd. such that the ratio would be P1:TGIC=90:10 (weight ratio), and kneaded at cylinder temperature 200° C., screw rotation speed 300 rpm and an output 250 g/min (residence time 120 sec) to obtain polylactic acid P4 which contains 10 wt % TGIC. The amount of residual lactide of the obtained polylactic acid was 0.15 wt %.

Production Example 2

Production of Polylactic Acid which Contains 10 wt % BPG

P1 and p-t-butyl phenyl glycidyl ether (hereunder, referred to as BPG) produced by Nagase Chemicals Ltd. were dried and then fed to a twin screw kneading extruder (screw diameter: 37 mm, L/D: 38.9) produced by Toshiba Machine Co., Ltd. such that the ratio would be P1:BPG=90:10 (weight ratio), and kneaded at cylinder temperature 200°, screw rotation speed 300 rpm and an output 250 g/min (residence time 120 sec) to obtain polylactic acid P5 which contains 10 wt % BPG. The amount of residual lactide of the obtained polylactic acid was 0.15 wt %.

Production Example 3

Production of Polylactic Acid which Contains 10 wt % Polycarbodiimide

P1 and polycarbodiimide "Carbodilite" HMV-8CA (hereunder, referred to as polycarbodiimide) produced by Nisshinbo Industries, Inc. were dried and then fed to a twin screw kneading extruder (screw diameter: 37 mm, L/D: 38.9) produced by Toshiba Machine Co., Ltd. such that the ratio would be P1:polycarbodiimide=90:10 (weight ratio), and kneaded at cylinder temperature 200° C., screw rotation speed 300 rpm and an output 250 g/min (residence time 120 sec) to obtain polylactic acid P6 which contains 10 wt % polycarbodiimide. The amount of residual lactide of the obtained polylactic acid was 0.15 wt %.

Production Example 4

Production of Polyglycolic Acid (PGA)

Glycolic acid 73% aqueous solution was concentrated and dehydrated under a reduced pressure at 180° C. for 4 hours in a reactor equipped with a stirrer to obtain a crystalline oligomer. Subsequently, after this oligomer was vacuum dried at 180° C. for 5 hours, it was subjected to a pyrolysis in nitrogen atmosphere at 300° to obtain a crude glycolide, and from this crude glycolide as starting material, a purified glycolide was obtained through purification by recrystallization method from ethyl acetate solution. This purified glycolide was mixed with stannous octoate 100 ppm and lauryl alcohol 100 ppm, and subjected to a ring-opening polymerization under nitrogen atmosphere at 180° C. for 3 hours in a reactor equipped with a stirrer to obtain polyglycolic acid P7 of which melting point was 224° C. Total carboxyl end group concentration of the obtained polyglycolic acid was 25 equivalent/ton.

Example 4

Polylactic acid P8 was obtained in the same way as Example 1 except that the cylinder temperature was changed to 260° C. Polylactic acid P8 emitted a heavy smoke when extruded, the spinneret was readily stained with sublimates and a long-run operation was difficult. And, the amount of residual lactide of the obtained polylactic acid was 0.35 wt %.

Example 5

Polylactic acid P9 was obtained in the same way as Example 1 except that the cylinder temperature was changed to 190° C. The total carboxyl end group concentration of the obtained polylactic acid P9 was 25 equivalent/ton.

Example 6

Polylactic acid P10 was obtained in the same way as Example 1 except changing the cylinder temperature to 240° C., the output to 80 g/min and the residence time in molten state to 370 sec. Polylactic acid P10, similar to Example 4, emitted a heavy smoke when extruded and the spinneret was readily stained with sublimates. And, the amount of residual lactide of the obtained polylactic acid was 0.32 wt %.

Example 7

Figure 1:
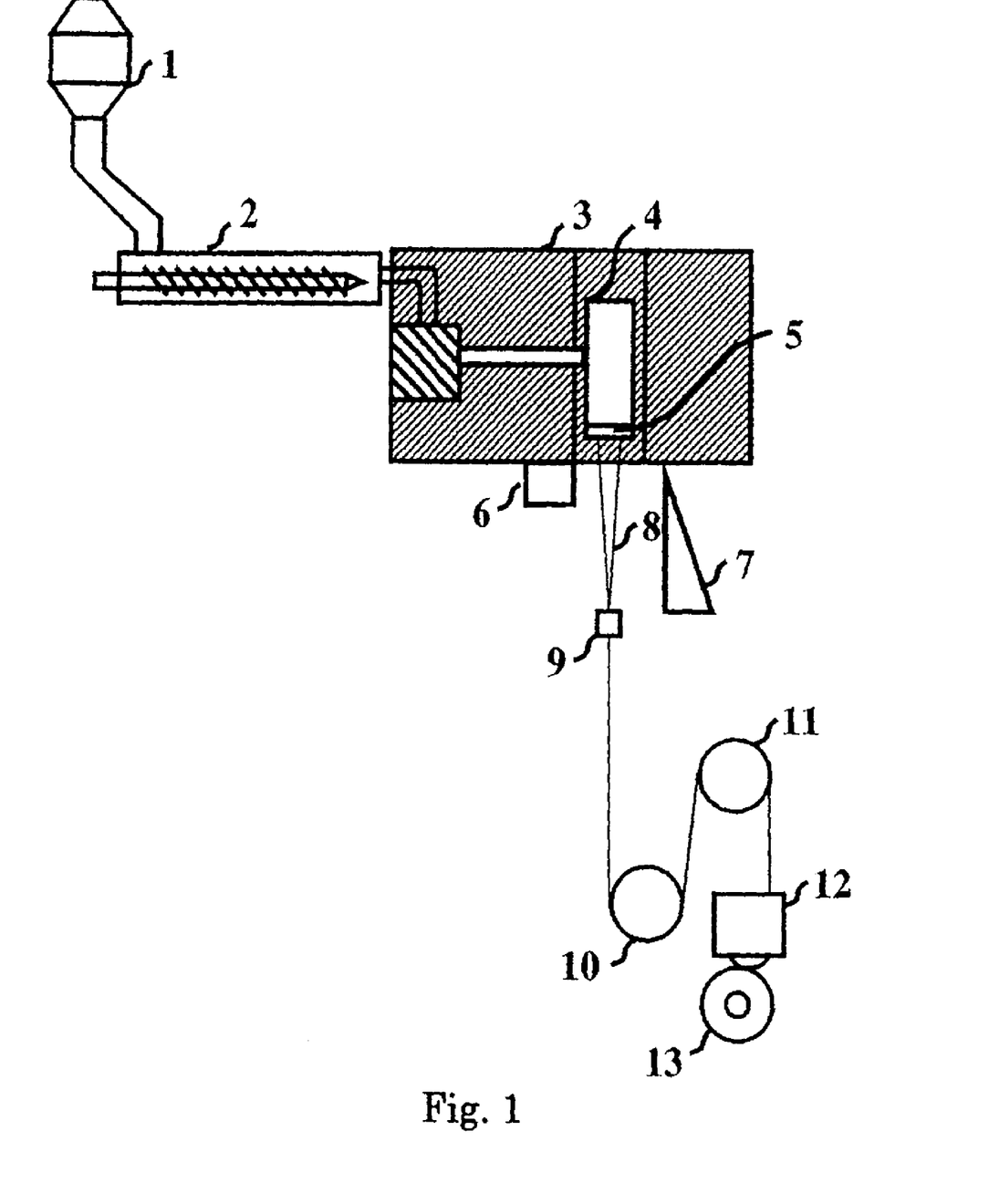
FIG. 1 is a brief illustration of a preferable spinning apparatus for producing fibers.

Polylactic acid P1(PLLA, melting point 172° C.) and polylactic acid P2 (DAMGIC 10 wt %) were respectively vacuum dried to water contents of 100 ppm or less, and they were chip blended in a ratio of P1:P2=9:1 (DAMGIC content: 1 wt %) to obtain an unstretched yarn by a spinning apparatus shown in FIG. 1. That is, the above-mentioned blended chips were fed to a spinning hopper 1, melted by a twin-screw extruding kneader 2 and then the molten polymer was introduced to a spinning pack 4 placed in a spinning block 3 heated at the temperature given below and extruded from a spinneret 5 (a residence time in molten state was 700 sec). At this time, a monomer suction device 6 was provided in a position 10 cm beneath the spinneret and sublimed monomer and oligomer were removed at the suction rate below mentioned. The extruded yarn 8 was cooled and solidified by the uniflow cooling device 7 and then oiled by the oiling device 9 provided 1.5 m beneath the spinneret, and after that, it was taken up by the first take-up roll 10, subsequently winded by the winder 12 via the second take up roll 11 to obtain an unstretched yarn of 118 dtex, 36 filaments (winded yarn (cheese package) 13). The spinning conditions at this time were as follows:

kneader temperature: 220° C.
spinning block temperature: 230° C.
filter layer: packed with 46# morundum
filter: 15 μm non-woven filter
spinneret: circular holes of spinning hole diameter 0.3 mm, hole depth 0.9 mm
output: 47.0 g/min
cooling: uniflow of cooling length 1 m, cooling air temperature 20° C., air flow speed 0.5 m/sec
oiling agent: 10% conc. emulsion type oiling agent of aliphatic ester was added 10% to fiber
spinning speed: 4000 m/min.

Figure 2:
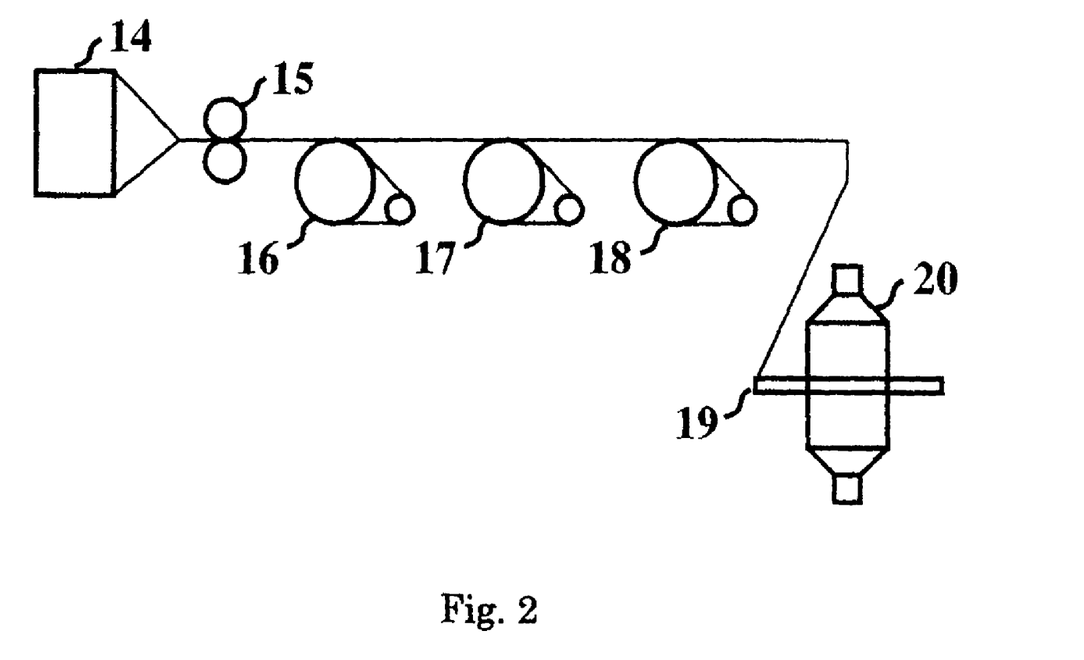
FIG. 2 is an illustration showing a preferable stretching apparatus for producing fibers.

Furthermore, a stretched yarn was obtained from this unstretched yarn by using the stretching apparatus shown in FIG. 2. That is, the cheese package 14 of the above-mentioned unstretched yarn was, via the feed roll 15, preheated at 98° C. by first hot roll 16 and then, stretched by 1.4 times at stretching speed of 900 m/min, heat set at 130° C. by the second hot roll 17, via cold roll 18, winded by the ring rail 19 to obtain a stretched yarn (winded yarn (pirn)) of 84 dtex, 36 filaments. Here, about 100 kg was sampled, but there was no yarn breakage, single fiber breakage or the like and the spinning was very stable. Similarly, all of the unstretched yarns were stretched, but there was no yarn breakage.

Measurement showed that the fiber samples obtained a weight average molecular weight, Mw, of 213,000, number average molecular weight, Mn, of 125,000, Mw/Mn of 1.70, and a carboxyl end group concentration of 3.0 equivalent/ton. In addition, the obtained fiber had a strength 4.0 cN/dtex, an elongation 40%, a yarn unevenness, U %, 0.5%, a boiling water shrinkage 10%, which are sufficient mechanical properties for general purpose clothings, and were also excellent in color tone and degree of whiteness. Furthermore, the strength retention in hydrolysis resistance test was 83%, indicating a far superior durability compared to those of the conventional polylactic acid fiber.

Example 8

A stretched yarn of 84 dtex 36 filaments was obtained in the same way as Example 7 except that polylactic acid P3 (MADGIC 10 wt %) was used instead of the polylactic acid P2 and the chip blend ratio, P1:P3, was changed to 9:1 (MADGIC content: 1 wt %). The stretched yarn of Example 8, like that of Example 7, had excellent mechanical properties, hydrolysis resistance, and was also excellent in color tone and degree of whiteness.

Example 9

A stretched yarn of 84 dtex 36 filaments was obtained in the same way as Example 7 except that polylactic acid P4 (TGIC 10 wt %) was used instead of polylactic acid P2 and the chip blend ratio, P1:P4, was changed to 9:1 (TGIC content: 1 wt %). The stretched yarn of Example 9 had better hydrolysis resistance than that of Example 7. And both of mechanical properties and color tone were good.

Comparative Example 1

A stretched yarn of 84 dtex 36 filaments was obtained in the same way as Example 7 except that polylactic acid P1 only was used. The stretched yarn of Comparative example 1 was excellent in mechanical properties and color tone, but the strength retention was very low as 32%, and the yarn was poor in practical applicability.

Comparative Example 2

A stretched yarn of 84 dtex 36 filaments was obtained in the same way as Example 7 except that polylactic acid P5 (BPG 10 wt %) was used instead of the polylactic acid P2 and the chip blend ratio, P1:P5, was changed to 9:1 (BPG content: 1 wt %). The stretched yarn of Comparative example 2 had a lower carboxyl end group concentration than that of Comparative example 1, but due to insufficient end-capping, the strength retention in hydrolysis resistance test was low as 42%, and the yarn was poor in practical applicability.

Comparative Example 3

A stretched yarn of 84 dtex 36 filaments was obtained in the same way as Example 7 except that polylactic acid P6 (polycarbodiimide 10 wt %) was used instead of polylactic acid P2 and the chip blend ratio, P1:P6, was changed to 9:1 (polycarbodiimide content: 1 wt %). The stretched yarn of Comparative example 3 had an excellent hydrolysis resistance as in Example 7, but its fiber forming ability was poor such that yarn breakage arose 5 times in about 100 kg sample production. Furthermore, the color tone was a little bit yellowish such that the b* value of the yarn was 8, and in addition, L* value was also high and its practical application was restricted.

Example 10

A stretched yarn of 84 dtex 36 filaments was obtained in the same way as Example 9 except that the blend ratio of polylactic acid P1 and polylactic acid P3 (MADGIC 10 wt %), P1:P2, was changed to 98:2 (MADGIC content: 0.2 wt %). The stretched yarn of Example 10 was a little bit inferior to that of Example 9 as the strength retention in the hydrolysis resistance test was 51%.

Example 11

A stretched yarn of 84 dtex 36 filaments was obtained in the same way as Example 9 except that the chip blend ratio of polylactic acid P1 and polylactic acid P3 (MADGIC 10 wt %), P1:P2, was changed to 95:5 (MADGIC content: 0.5 wt %). In Example 11, the strength retention in the hydrolysis resistance test was 65% which was inferior to that of Example 9, but it was a level of no problem in practical use.

Example 12

A stretched yarn of 84 dtex 36 filaments was obtained in the same way as Example 9 except that the chip blend ratio of polylactic acid P1 and polylactic acid P3 (MADGIC 10 wt %), P1:P2, was changed to 50:50 (MADGIC content: 5 wt %). In Example 12, the hydrolysis resistance was superior to that of Example 9. However, not only a smoke emission estimated to be from MADGIC arose at the spinning but also the obtained yarn exhibited a little bit yellowish color tone.

Example 13

A stretched yarn of 84 dtex 36 filaments was obtained in the same way as Example 9 except that only polylactic acid P3 (MADGIC 10 wt %) was used. In Example 13, a smoke emission estimated to be from MADGIC arose at the spinning and the extruded yarn is unstable in fining during cooling step to cause a frequent yarn breakage, but the strength retention of the obtained yarn was higher than that of Example 7. And, since the color tone was yellowish, its applicability was restricted.

Example 14

Polyglycolic acid P7 and polylactic acid P3 (MADGIC 10 wt %) were respectively vacuum dried to decrease their water contents to 100 or less ppm, and their chip blend ratio, P7:P3, was made to 9:1 (polyglycolic acid:polylactic acid: MADGIC=90:9:1, weight ratio), fed to a melt hopper, continuously stretched while being formed into a film by a molding machine equipped with a twin screw kneader, to obtain a film of an average thickness of about 250 μm. At this time, the molding conditions were as follows:
  kneader temperature: 220° C.
  T die temperature: 210° C.
  cooling temperature: casting drum temperature 60° C.
  1st step stretching condition: 1.3 times longitudinal stretching at stretching temperature of 70° C.
  2nd step drawing condition: 2.0 times transverse stretching at stretching temperature of 80° C.
  set temperature: 140° C.×12 seconds
  winding speed: 50 m/min.

The obtained film had an average tensile strength in longitudinal and transverse directions of 125 MPa, and its carboxyl end group concentration was 2.3 equivalent/ton, which means that the ends were sufficiently end-capped. Furthermore, the strength retention of said film in hydrolysis resistance test was 53%, which is a level having no problem in practical use.

Comparative Example 4

A stretched film was obtained in the same way as Example 14 except that only polyglycolic acid P7 was used. In Comparative example 4, the mechanical properties and color tone were excellent, but the strength retention in hydrolysis resistance test was very low as low as 10%, and it was a level of almost no practical use.

Example 15

A false twisted yarn was obtained by false twisting the stretched yarn of 84 dtex, 36 filaments obtained in Example 9 by a friction false twisting device equipped with three axis twister at a processing speed 500 m/min, disk rotation speed 4500 rpm (with 58 mm diameter urethane disks), hot plate temperature 130° C. (hot plate length 1.8 m) and stretch ratio 1.05 times. A yarn breakage and fluffs at the false twisting were not observed and false twisting ability was good. Physical properties of the obtained false twisted yarn were measured and it was found that the strength 2.5 cN/dtex, elongation 21%, boiling water shrinkage 10%, crimp elongation percentage 55%, crimp modulus 73% and they were excellent in both of the mechanical characteristics and crimp characteristics.

Furthermore, after this false twisted yarn was additionally oiled, it was subjected to S-twist of twist number 300 T/m, and by using this twisted yarn as warp and weft, a grey fabric of plain weave construction was prepared. Here, the warp and weft densities of the grey fabric were 115 yarns/2.54 cm and 85 yarns/2.54 cm, respectively. Furthermore, a woven fabric was obtained by subjecting the grey fabric to a dyeing process under the following conditions:

Cloth Processing Conditions a. scouring soda ash 1 g/L
  surfactant (Gran up US-20, product of Sanyo Chemical Industries, Ltd.) 0.5 g/L
  treating condition: 98° C.×20 min b. pre-set
  treating condition: 140° C.×3 min c. Dyeing
  Dianix Navy Blue ERFS 200 2% owf
  pH adjusting agent (acetic acid/sodium acetate buffer solution, pH5) 0.2 g/L
  treating condition: 110° C.×40 min d. Soaping
  surfactant (Gran up US-20, product of Sanyo Chemical Industries, Ltd.) 0.2 g/L
  treating condition: 60° C.×20 min e. Final set
  treating condition: 140° C.×3 min The total carboxyl end group concentration of the product of the obtained woven fabric just after the final set was 5.0, and it exhibited a good hydrolysis resistance.

TABLE 1

|  | Example 1 P2 | Example 2 P3 | Example 3 P4 | Example 4 P8 | Example 5 P9 | Example 6 P10 |
| --- | --- | --- | --- | --- | --- | --- |
| Aliphatic polyester | Polylactic acid | Polylactic acid | Polylactic acid | Polylactic acid | Polylactic acid | Polylactic acid |
| Capping agent | DAMGIC | MADGIC | TGIC | DAMGIC | DAMGIC | DAMGIC |
| Amount of capping agent (wt %) | 10 | 10 | 10 | 10 | 10 | 10 |
| Weight average molecular weight, Mw | 220,000 | 231,000 | 251,000 | 201,000 | 220,000 | 202,000 |
| Number average molecular weight, Mn | 129,000 | 131,000 | 133,000 | 115,000 | 129,000 | 112,000 |
| Mw/Mn | 1.71 | 1.76 | 1.89 | 1.75 | 1.71 | 1.80 |
| Amount of residual lactide (wt %) | 0.15 | 0.15 | 0.15 | 0.35 | 0.13 | 0.32 |
| Carboxyl end group concentration | 10.2 | 7.5 | 5.3 | 4.0 | 25 | 4.3 |

TABLE 2

|  | Example 7 | Example 8 | Example 9 | Comp. example 1 | Comp. example 2 | Comp. example 3 |
| --- | --- | --- | --- | --- | --- | --- |
| Starting material properties |  |  |  |  |  |  |
| Aliphatic polyester | PLLA | PLLA | PLLA | PLLA | PLLA | PLLA |
| Weight average molecular weight | 221,000 | 221,000 | 221,000 | 221,000 | 221,000 | 221,000 |

TABLE 2-continued

|  | Example 7 | Example 8 | Example 9 | Comp. example 1 | Comp. example 2 | Comp. example 3 |
|---|---|---|---|---|---|---|
| Melting point (° C.) | 172 | 172 | 172 | 172 | 172 | 172 |
| Amount of residual lactide (wt %) | 0.13 | 0.13 | 0.13 | 0.13 | 0.13 | 0.13 |
| Carboxyl end group concentration | 30 | 30 | 30 | 30 | 30 | 30 |
| Capping agent | — | — | — | — | — | — |
| Capping agent | DAMGIC | MADGIC | TGIC | — | BPG | Poly-carbodiimide |
| Amount of capping agent the (wt %) | 1 wt % | 1 wt % | 1 wt % | 0 wt % | 1 wt % | 1 wt % |
| Fiber-forming ability | good | good | good | good | good | Some yarn breakage |
| Physical properties of molded article | | | | | | |
| Configuration | Fiber | Fiber | Fiber | Fiber | Fiber | Fiber |
| Weight average molecular weight, Mw | 213,000 | 226,000 | 248,000 | 209,000 | 210,000 | 252,000 |
| Number average molecular weight, Mn | 125,000 | 127,000 | 132,000 | 124,000 | 124,000 | 125,000 |
| Mw/Mn | 1.70 | 1.78 | 1.88 | 1.69 | 1.70 | 2.02 |
| Carboxyl end group concentration | 3.0 | 3.0 | 2.8 | 32 | 23 | 6.5 |
| Fiber thickness (dtex) | 84.0 | 84.0 | 84.0 | 84.0 | 84.0 | 84.0 |
| Strength (cN/dtex) | 4.0 | 4.0 | 3.9 | 4.0 | 4.0 | 3.3 |
| Elongation (%) | 40 | 38 | 38 | 42 | 40 | 38 |
| U % (%) | 0.5 | 0.5 | 0.6 | 0.5 | 0.5 | 1.2 |
| Boiling water shrinkage (%) | 10 | 11 | 11 | 9 | 10 | 12 |
| Strength retention (%) | 83 | 84 | 86 | 32 | 42 | 80 |
| Color tone L* value | 68 | 70 | 70 | 67 | 67 | 83 |
| Color tone a* value | −1 | −1 | −1 | −1 | −2 | 0 |
| Color tone b* value | 2 | 2 | 3 | 1 | 5 | 8 |

TABLE 3

|  | Example 10 | Example 11 | Example 12 | Example 13 | Example 14 | Comp. example 4 |
|---|---|---|---|---|---|---|
| Starting material properties | | | | | | |
| Aliphatic polyester | PLLA | PLLA | PLLA | PLLA | PGA | PGA |
| Weight average molecular weight | 221,000 | 221,000 | 221,000 | 221,000 | — | — |
| Melting point (° C.) | 172 | 172 | 172 | 172 | 224 | 224 |
| Amount of residual lactide (wt %) | 0.13 | 0.13 | 0.13 | 0.13 | — | — |
| Carboxyl end group concentration | 30 | 30 | 30 | 30 | 25 | 25 |
| Capping agent | — | — | — | — | — | — |
| Capping agent | MADGIC | MADGIC | MADGIC | MADGIC | MADGIC | — |
| Amount of addition of capping agent (wt %) | 0.2 wt % | 0.5 wt % | 5.0 wt % | 10 wt % | 1 wt % | 0 wt % |
| Fiber-forming ability | good | good | some yarn breakage | frequent yarn breakage | — | — |
| Film-forming ability | — | — | — | — | good | good |
| Physical properties of molded article | | | | | | |
| Configuration | Fiber | Fiber | Fiber | Fiber | film | film |
| Weight average molecular weight, Mw | 211.000 | 212,000 | 251,000 | 376,000 | — | — |
| Number average molecular weight, Mn | 124,000 | 124,000 | 130,000 | 149,000 | — | — |
| Mw/Mn | 1.70 | 1.71 | 1.93 | 2.52 | — | — |
| Carboxyl end group concentration | 21 | 14 | 1.8 | 0 | 2.3 | 27 |
| Fiber thickness (dtex) | 84.0 | 84.0 | 84.0 | 84.0 | — | — |
| Strength (cN/dtex) | 4.0 | 4.0 | 3.5 | 2.4 | — | — |
| Strength (MPa) | — | — | — | — | 125 | 123 |
| Elongation (%) | 40 | 40 | 42 | 34 | — | — |
| U % (%) | 0.5 | 0.5 | 0.8 | 2.1 | — | — |

TABLE 3-continued

|  | Example 10 | Example 11 | Example 12 | Example 13 | Example 14 | Comp. example 4 |
|---|---|---|---|---|---|---|
| Boiling water shrinkage (%) | 10 | 10 | 12 | 13 | — | — |
| Strength retention (%) | 51 | 65 | 88 | 88 | 53 | 10 |
| Color tone L* value | 67 | 67 | 73 | 82 | 80 | 70 |
| Color tone a* value | −1 | −1 | −1 | 0 | 0 | −1 |
| Color tone b* value | 1 | 1 | 5 | 7 | 3 | 2 |

INDUSTRIAL APPLICABILITY

The resin composition can usefully be applied as, in particular, fiber products since it has superior properties in hydrolysis resistance, strength and color tone to those of conventional aliphatic polyesters.

The invention claimed is:

1. A fiber comprising a resin composition comprising 1) an aliphatic polyester resin of which carboxyl groups of one end or both ends of molecular chain ends are capped with at least one kind of compounds represented by General formula (I) and 2) at least one kind of compounds represented by General formula (I), wherein an end group concentration of the carboxyl group of the aliphatic polyester resin is 0 to 15 equivalent/ton, and an a* value which is an index of red color tone of the fiber is −5 to 5 and the b* value of the fiber is −6 to 6 in the L*a*b* color coordinate system:

(I)

wherein at least one of $R_1$ to $R_3$ is glycidyl group and others are hydrogen, an alkyl group with 1 to 10 carbon atoms, hydroxyl group or allyl group.

2. The fiber according to claim 1, wherein the compound represented by General formula (I) is present in an amount of 0.1 to 8 wt % based on the total resin composition.

3. The fiber according to claim 1, wherein the aliphatic polyester resin is polylactic acid.

4. The fiber according to claim 1, wherein a molecular weight of the aliphatic polyester constituting the resin composition is in the following ranges, respectively:
Mw: 80,000 to 500,000
Mw/Mn: 1.5 to 4
(Mw is a weight average molecular weight, Mn is a number average molecular weight and they are values measured by gel-permeation chromatography and converted to those of polystyrene.)

5. The fiber according to claim 4, wherein the Mw/Mn is 1.5 to 2.

6. The fiber according to claim 1, wherein the compound represented by General formula (I) is one or more compounds selected from diallyl monoglycidyl isocyanurate, monoallyl diglycidyl isocyanurate and triglycidyl isocyanurate.

7. The fiber according to claim 1, wherein the aliphatic polyester resin having the carboxyl group at molecular chain ends and at least one kind of compounds represented by General formula (I) are mixed in a molten state or in a solution state.

8. A multifilament comprising the fiber of claim 1, wherein physical properties of said multifilament satisfy the following characteristics:
Mw/Mn 1.5 to 2.5
Strength 2 to 8 cN/dtex
Elongation 20 to 80%
Boiling water shrinkage 0 to 20%
Yarn unevenness U % 0.1 to 2%
Strength retention 50 to 99%.

9. A method of producing a fiber comprising feeding a compound represented by General formula (I) or a composition containing said compound into a kneader such that an added amount of said compound is 0.1 to 40 wt % to a resin composition containing an aliphatic polyester resin having carboxyl groups at molecular chain ends, extruding the composition after kneading at a kneading temperature of 200 to 250° C. within a residence time in a molten state of 300 seconds or less (I)

wherein at least one of $R_1$ to $R_3$ is glycidyl group and others are hydrogen, an alkyl group with 1 to 10 carbon atoms, hydroxyl group or allyl group, and melt-spinning the extruded composition at a spinning temperature of 200 to 250° C. with a residence time in a molten state for 180 to 1800 seconds and at a spinning speed of 500 to 10000 m/min.

10. A method of producing a fiber comprising mixing a pellet formed from the resin composition of claim 9 and a pellet of an aliphatic polyester resin containing carboxyl groups at molecular chain ends such that an amount of the compound represented by General formula (I) is 0.1 to 8 wt %, and melt-spinning a resulting mixture at a spinning temperature of 200 to 250° C., a residence time in a molten state of 180 to 1800 seconds and at a spinning speed of 500 to 10000 m/min.

* * * * *